(12) United States Patent
Jeevan

(10) Patent No.: US 11,756,418 B2
(45) Date of Patent: Sep. 12, 2023

(54) DEVICE, METHOD, AND STORAGE MEDIUM

(71) Applicant: HONDA MOTOR CO., LTD., Tokyo (JP)

(72) Inventor: Jovin Dsa Jeevan, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 406 days.

(21) Appl. No.: 17/068,846

(22) Filed: Oct. 13, 2020

(65) Prior Publication Data

US 2021/0118289 A1 Apr. 22, 2021

(30) Foreign Application Priority Data

Oct. 18, 2019 (JP) .................................. 2019-191026
Aug. 25, 2020 (JP) .................................. 2020-141958

(51) Int. Cl.
*G08G 1/01* (2006.01)
*G08G 1/015* (2006.01)
*G08G 1/052* (2006.01)
*G08G 1/065* (2006.01)

(52) U.S. Cl.
CPC ........... *G08G 1/0145* (2013.01); *G08G 1/015* (2013.01); *G08G 1/0133* (2013.01); *G08G 1/052* (2013.01); *G08G 1/065* (2013.01)

(58) Field of Classification Search
CPC .... G08G 1/0145; G08G 1/0133; G08G 1/015; G08G 1/052; G08G 1/065; G08G 1/166; G08G 1/0969; G08G 1/096861; B60W 2554/402; B60W 2554/4026; B60W 2554/4029; B60W 2554/4045; B60W 60/00272; B60W 60/00276
See application file for complete search history.

(56) References Cited

U.S. PATENT DOCUMENTS

2020/0211395 A1\* 7/2020 Feist ...................... G06V 20/58

OTHER PUBLICATIONS

D. Helbing and P. Molnar, "Social Force Model for Pedestrian Dynamics", May 20, 1998.
G. Arechavaleta and J. Laumond, "The nonholonomic nature of human locomotion: a modeling study", Feb. 2006.
D. Clever et al., An Inverse Optimal Control Approach for the Transfer of Human Walking Motions in Constrained Environment to Humanoid Robots, 2016.
(Continued)

*Primary Examiner* — Joseph H Feild
*Assistant Examiner* — Sharmin Akhter
(74) *Attorney, Agent, or Firm* — AMIN, TUROCY & WATSON, LLP

(57) ABSTRACT

A device includes a storage device configured to store a program; and a hardware processor, wherein, the hardware processor executes the program stored in the storage device to: recognize positions of a plurality of traffic participants; determine a temporary goal which each of the plurality of traffic participants is trying to reach in the future, based on the recognition results; and simulate a movement process in which each of the plurality of traffic participants moves toward the temporary goal using a movement model to estimate an action in the future of each of the plurality of traffic participants.

8 Claims, 7 Drawing Sheets

(56) References Cited

OTHER PUBLICATIONS

M. Luber, J. A. Stork, G. D. Tipaldi, and K. O. Arras, "People tracking with human motion predictions from social forces," Proc.—IEEE Int. Conf. Robot. Autom., pp. 464-469, 2010.

F. Farina, D. Fontanelli, A. Garulli, A. Giannitrapani, and D. Prattichizzo, "When Helbing Meets Laumond: The Headed Social Force Model." Dec. 12-14, 2016.

* cited by examiner

DEVICE, METHOD, AND STORAGE MEDIUM

CROSS-REFERENCE TO RELATED APPLICATION

Priority is claimed on Japanese Patent Application No. 2019-191026 filed Oct. 18, 2019 and Japanese Patent Application No. 2020-141958, filed Aug. 25, 2020, the content of which is incorporated herein by reference.

BACKGROUND

Field of the Invention

The present invention relates to a device, a method, and a storage medium.

Description of Related Art

In the related art, research has been conducted on estimating an action (movement) of pedestrians, bicycles, and the like present on roads in the future. ((A) D. Helbing and P. Molnar, "Social Force Model for Pedestrian Dynamics," 20 May 1998. (B) G. Arechavaleta and J. Laumond, "The nonholonomic nature of human locomotion: a modeling study," February 2006. (C) D. Clever and K. Mombaur, "An Inverse Optimal Control Approach for the Transfer of Human Walkinsg Motions in Constrained Environment to Humanoid Robots", 2016. (D) M. Luber, J. A. Stork, G. D. Tipaldi, and K. O. Arras, "People tracking with human motion predictions from social forces," Proc.-IEEE Int. Conf. Robot. Autom., pp. 464 to 469, 2010. (E) F. Farina, D. Fontanelli, A. Garulli, A. Giannitrapani, and D. Prattichizzo, "When Helbing Meets Laumond: The Headed Social Force Model." 12 to 14 Dec. 2016.)

SUMMARY

The technology described in Document (A) performs an estimation based on the assumption that a pedestrian's goal (destination) and the like are provided as known information and may not be able to make a prediction in accordance with an actual traffic situation in some cases.

An aspect of the present invention was made in consideration of such circumstances, and an object of the present invention is to provide a device, a method, and a storage medium capable of making a prediction in accordance with an actual traffic situation.

A device, a method, and a storage medium according to the present invention have the following constitutions.

(1): A device according to an aspect of the present invention includes: a storage device configured to store a program; and a hardware processor, wherein, the hardware processor executes the program stored in the storage device to: recognize positions of a plurality of traffic participants; determine a temporary goal which each of the plurality of traffic participants is trying to reach in the future, based on the recognition results; and simulate a movement process in which each of the plurality of traffic participants moves toward the temporary goal using a movement model to estimate an action in the future of each of the plurality of traffic participants.

(2): In the aspect of (1), for each of the plurality of traffic participants, the hardware processor may set a plurality of temporary goal candidates based on histories of the recognized positions of the plurality of traffic participants and information indicating a road structure, and obtain a deviation between the result of a simulation in which each of the traffic participants moves to each of the plurality of temporary goal candidates and a movement direction based on a posture of the traffic participants, and determines, as the temporary goal, a temporary goal candidate having the smallest deviation.

(3): In the aspect of (1), the movement model may simulate a movement process of the traffic participant in the future in each step by reflecting a virtual force acting on each of the plurality of traffic participants, and the hardware processor may estimate the virtual force based on the surrounding environment of the plurality of traffic participants.

(4): In the aspect of (3), the hardware processor may estimate the virtual force on the assumption that an influence factor in which the virtual force is exerted on each of the plurality of traffic participants is limited to influence factors present within a fan-shaped range centering on a forward direction of each of the traffic participants and an influence factor outside of this range does not exert a force.

(5): In the aspect of (3), a virtual force estimated by a force predictor may include a force for performing acceleration and deceleration so that the traffic participant himself/herself moves at a desired speed, and the hardware processor may estimate the desired speed based on a history of a position in the past of the traffic participant.

(6): In the aspect of (3), a virtual force estimated by a force predictor may include forces repelling each other among the traffic participants, and the hardware processor may estimate traffic participants forming a group among the plurality of traffic participants and reduces the forces repelling each other among the traffic participants which are estimated to belong to the same group as compared with traffic participants which are not estimated to belong to the same group.

(7): In the aspect of (1), the hardware processor may control the traveling of a vehicle based on the estimated actions in the future of each of the plurality of traffic participants.

(8): A method executed using a computer according to another aspect of the present invention includes: recognizing positions of a plurality of traffic participants; determining a temporary goal to be reached in the future for each of the plurality of traffic participants, based on the recognition results; and simulating a movement process in which each of the plurality of traffic participants moves toward the determined temporary goal using a movement model to estimate an action in the future of each of the plurality of traffic participants.

(9): A non-transitory storage medium according to another aspect of the present invention which stores a program causing a computer to execute: recognizing positions of a plurality of traffic participants; determining a temporary goal to be reached in the future for each of the plurality of traffic participants, based on the recognition results; and simulating a movement process in which each of the plurality of traffic participants moves toward a temporary goal determined by a predicting unit using a movement model to estimate an action in the future of each of the plurality of traffic participants.

According to the aspects of (1) to (9) described above, it is possible to make a prediction in accordance with an actual traffic situation.

DESCRIPTION OF EMBODIMENTS

Embodiments of a device, a method, and a storage medium of the present invention will be described below with reference to the drawings.

[Overall Constitution]

Figure 1:
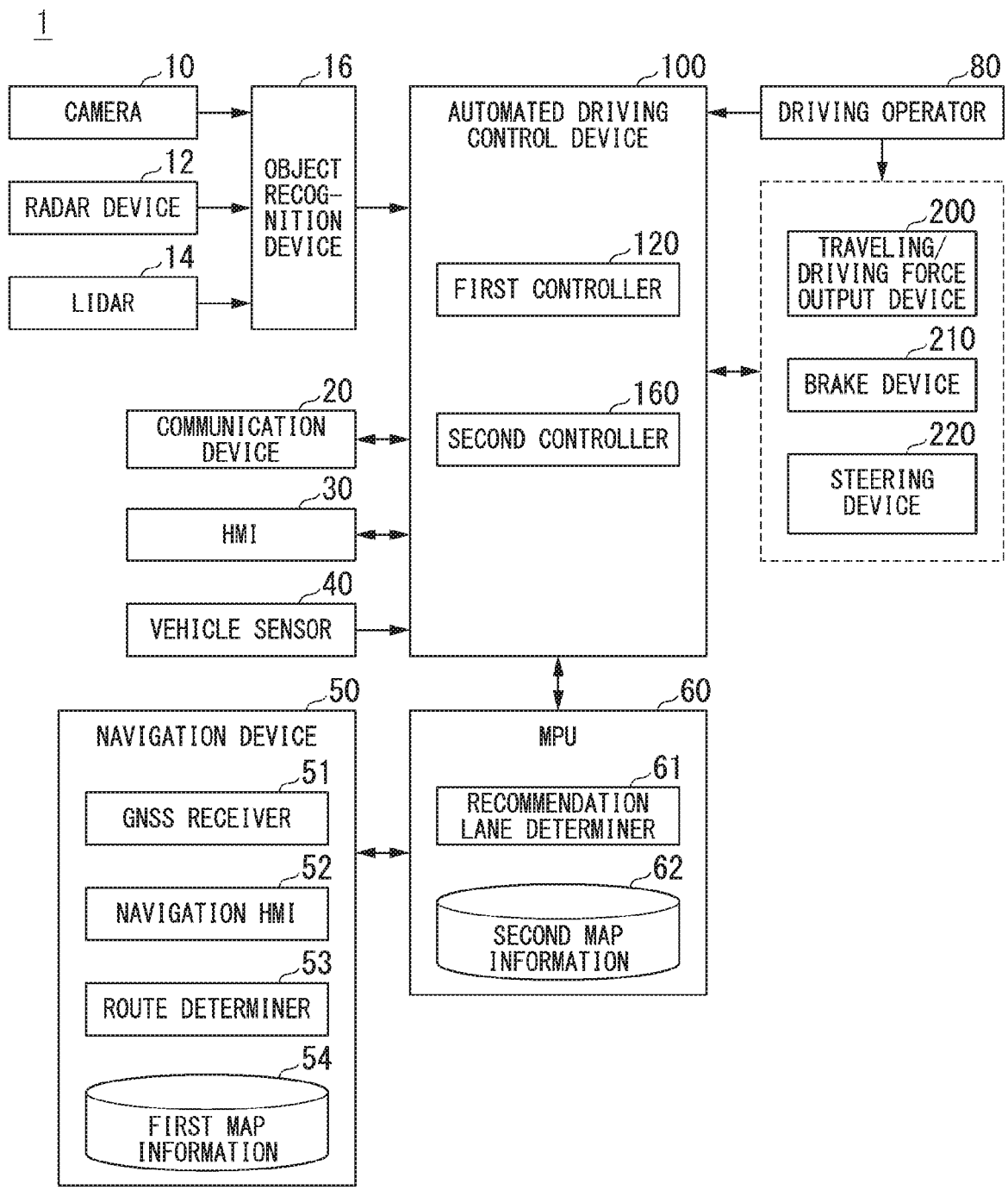
FIG. 1 is a diagram illustrating a constitution of a vehicle system in which a device according to an embodiment is utilized.

FIG. 1 is a diagram illustrating a constitution of a vehicle system 1 in which a device according to an embodiment is utilized. A vehicle in which the vehicle system 1 is installed is, for example, a vehicle such as a two-wheeled vehicle, a three-wheeled vehicle, and a four-wheeled vehicle. In addition, a drive source thereof includes internal combustion engines such as diesel engines and gasoline engines, electric motors, and combinations thereof. The electric motors operate using electric power generated by electric generators joined to the internal combustion engines or electric power discharged from secondary batteries or fuel cells.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a traveling/driving force output device 200, a brake device 210, and a steering device 220. These devices and apparatuses are connected to each other through multiple communication lines such as controller area network (CAN) communication lines, serial communication lines, or wireless communication networks. The constitution illustrated in FIG. 1 is merely an example and a part of the constitution may be omitted or may have another constitution added thereto.

The camera 10 is, for example, a digital camera in which a solid-state imaging device such as a charge coupled device (CCD) and a complementary metal oxide semiconductor (CMOS) is utilized. The camera 10 is attached to an arbitrary location of a vehicle in which the vehicle system 1 is installed (hereinafter referred to as a "subject vehicle M"). When capturing a scene in front of the vehicle, the camera 10 is attached to an upper portion of a front windshield, a rear surface of a rearview mirror, or the like. The camera 10, for example, periodically and repeatedly captures an image of the surroundings of the subject vehicle M. The camera 10 may be a stereo camera.

The radar device 12 irradiates the surroundings of the subject vehicle M with radio waves such as millimeter waves, detects radio waves reflected by an object (reflected waves), and detects at least a position (a distance and a direction) of the object. The radar device 12 is attached to an arbitrary location of the subject vehicle M. The radar device 12 may detect a position and a speed of the object through a frequency modulated continuous wave (FM-CW) method.

The LIDAR 14 irradiates the surroundings of the subject vehicle M with light (or electromagnetic waves having a wavelength close to that of light) and measures scattered light. The LIDAR 14 detects a distance to a target based on a time from light emission to light reception. Light to be radiated is, for example, pulsed laser light. The LIDAR 14 is attached to an arbitrary location of the subject vehicle M.

The object recognition device 16 performs sensor fusion processing on the detection results obtained by a part or all of the camera 10, the radar device 12, and the LIDAR 14 and recognizes a position, a type, a speed, or the like of an object. The object recognition device 16 outputs the recognition result to the automated driving control device 100. The object recognition device 16 may directly output the detection results of the camera 10, the radar device 12, and the LIDAR 14 to the automated driving control device 100. The object recognition device 16 may be omitted from the vehicle system 1.

The communication device 20 communicates with other vehicles present around the subject vehicle M or communicates with various server devices via a wireless base station using, for example, a cellular network, a Wi-Fi network, Bluetooth (registered trademark), dedicated short range communication (DSRC), or the like.

The HMI 30 presents various information to an occupant of the subject vehicle M and receives an input operation by the occupant. The HMI 30 includes various display devices, speakers, buzzers, touch panels, switches, keys, and the like.

The vehicle sensor 40 includes a vehicle speed sensor which detects a speed of the subject vehicle M, an acceleration sensor which detects acceleration, a yaw rate sensor which detects an angular speed around a vertical axis, a direction sensor which detects a direction of the subject vehicle M, and the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) and a flash memory. The GNSS receiver 51 specifies a position of the subject vehicle M based on signals received from GNSS satellites. The position of the subject vehicle M may be specified or supplemented using an inertial navigation system (INS) in which an output of the vehicle sensor 40 is used. The navigation HMI 52 includes a display device, a speaker, a touch panel, a key, and the like. The navigation HMI 52 may be partly or wholly shared with the HMI 30 described above. The route determiner 53, for example, determines a route to a route to a destination which has been input by the occupant (hereinafter referred to as a "route on a map") using the navigation HMI 52 from a position of the subject vehicle M specified through the GNSS receiver 51 (or an arbitrary input position) with reference to the first map information 54. The first map information 54 is, for example, information in which a road shape is expressed using links indicating roads and nodes connected by the links. The first map information 54 may include a curvature of a road, point of interest (POI) information, and the like. The route on a map is output to the MPU 60. The navigation device 50 may perform a route guidance using the navigation HMI 52 based on the route on a map. The navigation device 50 may be implemented through, for example, a function of a terminal device such as a smartphone or a tablet terminal owned by an occupant. The navigation device 50 may transmit a position and destination in the present to a navigation server via the communication device 20 and acquire a route which is equivalent to the route on a map from the navigation server.

The MPU 60 includes, for example, a recommendation lane determiner 61 and holds second map information 62 in a storage device such as an HDD and a flash memory. The recommendation lane determiner 61 divides the route on a map provided from the navigation device 50 into a plurality of blocks (for example, performs division every 100 [m] in a vehicle traveling direction) and determines a recommended lane for each block with reference to the second map information 62. The recommendation lane determiner 61 performs determination concerning the details of a lane in which the vehicle is to travel from the leftmost lane. The recommendation lane determiner 61 determines a recommended lane so that the subject vehicle M can travel on a reasonable route for traveling to a branch destination when a branch location is present on the route on a map.

The second map information 62 is more accurate map information than the first map information 54. The second map information 62 includes, for example, information regarding a center of a lane or information regarding a boundary of a lane. The second map information 62 may include road information, traffic regulation information, address information (address/postal code), facility information, telephone number information, and the like. The second map information 62 may be updated at any time using the communication device 20 communicating with another device.

The driving operator 80 includes, for example, an accelerator pedal, a brake pedal, a shift lever, a steering wheel, a modified steer, a joystick, and other operation elements. A sensor which detects an amount of operation or the presence or absence of an operation is attached to the driving operator 80. In addition, the detection results are output to the automated driving control device 100, or a part or all of the traveling/driving force output device 200, the brake device 210, and the steering device 220.

The automated driving control device 100 includes, for example, a first controller 120 and a second controller 180. Each of the first controller 120 and the second controller 180 is realized using, for example, a hardware processor such as a central processing unit (CPU) configured to execute program (software). Some or all of these constituent elements may be implemented using hardware (a circuit section; including a circuitry) such as a large scale integration (LSI), an application specific integrated circuit (ASIC), a field-programmable gate array (FPGA), and a graphics processing unit (GPU) or may be realized in cooperation of software and hardware. A program may be stored in advance in a storage device such as an HDD and a flash memory (a storage device including a non-transitory storage medium) of the automated driving control device 100, or may be stored in a removable storage medium such as a DVD and a CD-ROM, and installed in an HDD or a flash memory of the automated driving control device 100 by installing a storage medium (a non-transitory storage medium) in a drive device.

Figure 2:
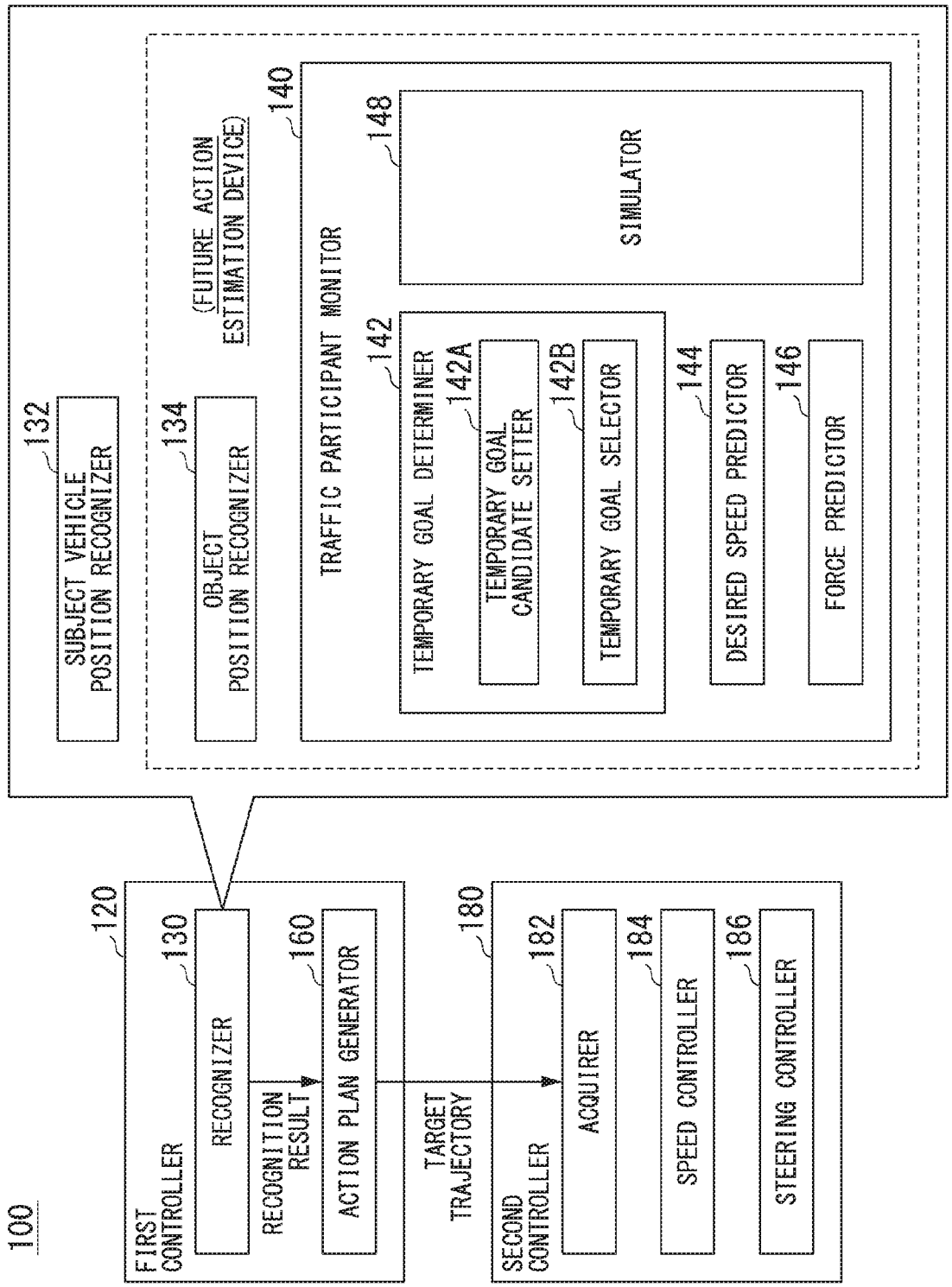
FIG. 2 is a diagram illustrating a functional constitution of a first controller and a second controller.

FIG. 2 is a diagram illustrating a functional constitution of the first controller 120 and the second controller 180. The first controller 120 includes, for example, a recognizer 130 and an action plan generator 160. The first controller 120, for example, realizes a function in which artificial intelligence (AI) is utilized and a function in which a predetermined model is utilized in parallel. For example, a function of "recognizing an intersection" may be realized by performing the recognition of an intersection through deep learning or the like and the recognition based on predetermined conditions (including signals which enable pattern matching, road markings, and the like) in parallel, scoring these recognitions, and performing a comprehensive evaluation. Thus, this ensures the reliability of automated driving.

The recognizer 130 includes, for example, a subject vehicle position recognizer 132, an object position recognizer 134, and a traffic participant monitor 140.

The subject vehicle position recognizer 132 recognizes a lane in which the subject vehicle M is traveling (a traveling lane) and a position of the subject vehicle M with respect to the traveling lane based on information to be input from the camera 10, the radar device 12, and the LIDAR 14 via the object recognition device 16. The subject vehicle position recognizer 132, for example, recognizes a traveling lane by comparing a pattern of road marking lines (for example, an array of solid lines and broken lines) obtained from the second map information 62 with a pattern of road marking lines around the subject vehicle M recognized from an image which has been captured by the camera 10. The subject vehicle position recognizer 132 may recognize a traveling lane by recognizing not only a road marking line but also a traveling road boundary (a road boundary) including a road marking line, a shoulder, a curb, a median strip, a guardrail, and the like. In this recognition, the position of the subject vehicle M acquired from the navigation device 50 and the processing results obtained using the INS may be taken into consideration.

The subject vehicle position recognizer 132 recognizes a position and a posture of the subject vehicle M with respect to a traveling lane. The subject vehicle position recognizer 132 may, for example, recognize the deviation from a central portion of a traveling lane which is a reference point (for example, a center of gravity, a center of a rear wheel axle, or the like) of the subject vehicle M and an angle formed by a direction in which the subject vehicle M moves forward and a virtual line drawn along the central portion of the traveling lane, as a relative position and a posture of the subject vehicle M with respect to the traveling lane. Instead of this, the subject vehicle position recognizer 132 may recognize the position of the reference point of the subject vehicle M with respect to one of side end portions of the traveling lane (a road marking line or a road boundary), as a relative position of the subject vehicle M with respect to the traveling lane.

The object position recognizer 134 recognizes a position, a type, a speed, acceleration, and the like of an object present around the subject vehicle M by performing processing of a Kalman filter or the like based on information which has been input from the camera 10, the radar device 12, and the LIDAR 14 via the object recognition device 16. The position of the object is recognized as, for example, a position above an absolute coordinate in which a representative point (a center of gravity, a center of a drive axis, or the like) of the subject vehicle M is used as an origin and is used for control. The position of the object may be represented by a representative point such as a center of gravity or a corner of the object or may be represented by a represented region. A "state" of the object may include acceleration, a jerk, or an "action state" of the object (for example, whether the subject vehicle is changing its lane or whether the subject vehicle is trying to change its lane). Types of objects are classified into pedestrians, bicycles, vehicles, and obstacles. Among the objects, pedestrians or objects including pedestrians and bicycles are referred to as "traffic participant." Therefore, the object position recognizer 134 recognizes the position of an object including traffic participants.

The traffic participant monitor 140 monitors an action of a traffic participant recognized by an object recognizer. A constitution and an operation of the traffic participant monitor 140 will be described later.

The action plan generator 160 includes generating a target trajectory in which the subject vehicle M automatically travels (regardless of a driver's operation) in the future so that the subject vehicle can travel in principle in a recommended lane which has been determined by the recommendation lane determiner 61 and respond to surrounding situations of the subject vehicle M. The expression "so that the subject vehicle can respond to surrounding situations of the subject vehicle M" includes generating a target trajectory so that the subject vehicle does not approach a position of a traffic participant in the future as close as possible. The target trajectory includes, for example, a speed element. For example, the target trajectory is represented as a sequence of points (trajectory points) in which the subject vehicle M needs to reach. The trajectory point is a point in which the subject vehicle M needs to reach for each predetermined traveling distance (for example, about several [m]) in a road distance. In addition, apart from that, a target speed and target acceleration for each predetermined sampling time (for example, about 0.X seconds [sec]) are generated as a part of the target trajectory. The trajectory point may be a position in which the subject vehicle M needs to reach at a sampling time for each predetermined sampling time. In this case, information concerning a target speed and target acceleration is represented at intervals between the trajectory points.

The second controller 180 controls the traveling/driving force output device 200, the brake device 210, and the steering device 220 so that the subject vehicle M passes through the target trajectory which has been generated by the action plan generator 160 at a scheduled time.

The second controller 180 includes, for example, an acquirer 182, a speed controller 184, and a steering controller 186. The acquirer 182 acquires information concerning a target trajectory (a trajectory point) which has been generated by the action plan generator 160 and stores the information in a memory (not shown). The speed controller 184 controls the traveling/driving force output device 200 or the brake device 210 based on the speed element associated with the target trajectory stored in the memory. The steering controller 186 controls the steering device 220 in accordance with a degree of bending of the target trajectory which has been stored in the memory. The processing of the speed controller 184 and the steering controller 186 is realized through, for example, a combination of feedforward control and feedback control. As an example, the steering controller 186 performs a combination of feedforward control according to a curvature of a road in front of the subject vehicle M and feedback control based on the deviation from the target trajectory.

The traveling/driving force output device 200 outputs a traveling drive force (a torque) by which the vehicle travels to a drive wheel. The traveling/driving force output device 200 includes, for example, a combination of an internal combustion engine, an electric motor, a transmission, and the like and an electronic controller (ECU) configured to control these. The ECU controls the above constituent elements in accordance with information input from the second controller 180 or information input from the driving operator 80.

The brake device 210 includes, for example, a brake caliper, a cylinder which transmits hydraulic pressure to the brake caliper, an electric motor which generates hydraulic pressure in the cylinder, and a brake ECU. The brake ECU controls the electric motor in accordance with information input from the second controller 180 or information input from the driving operator 80 so that a brake torque according to a braking operation is output to each wheel. The brake device 210 may include, as a backup, a mechanism which transmits hydraulic pressure generated through an operation of the brake pedal included in the driving operator 80 to the cylinder via a master cylinder. The brake device 210 is not limited to the constitution described above and may be an electronically controlled hydraulic pressure brake device in which hydraulic pressure of the master cylinder is transmitted to the cylinder by controlling an actuator in accordance with information input from the second controller 180.

The steering device 220 includes, for example, a steering ECU and an electric motor. The electric motor, for example, changes a direction of a steered wheel by applying a force to a rack and pinion mechanism. The steering ECU drives the electric motor in accordance with information input from the second controller 180 or information input from the driving operator 80 to change the direction of the steered wheel.

[Estimation of Action in Future]

Figure 3:
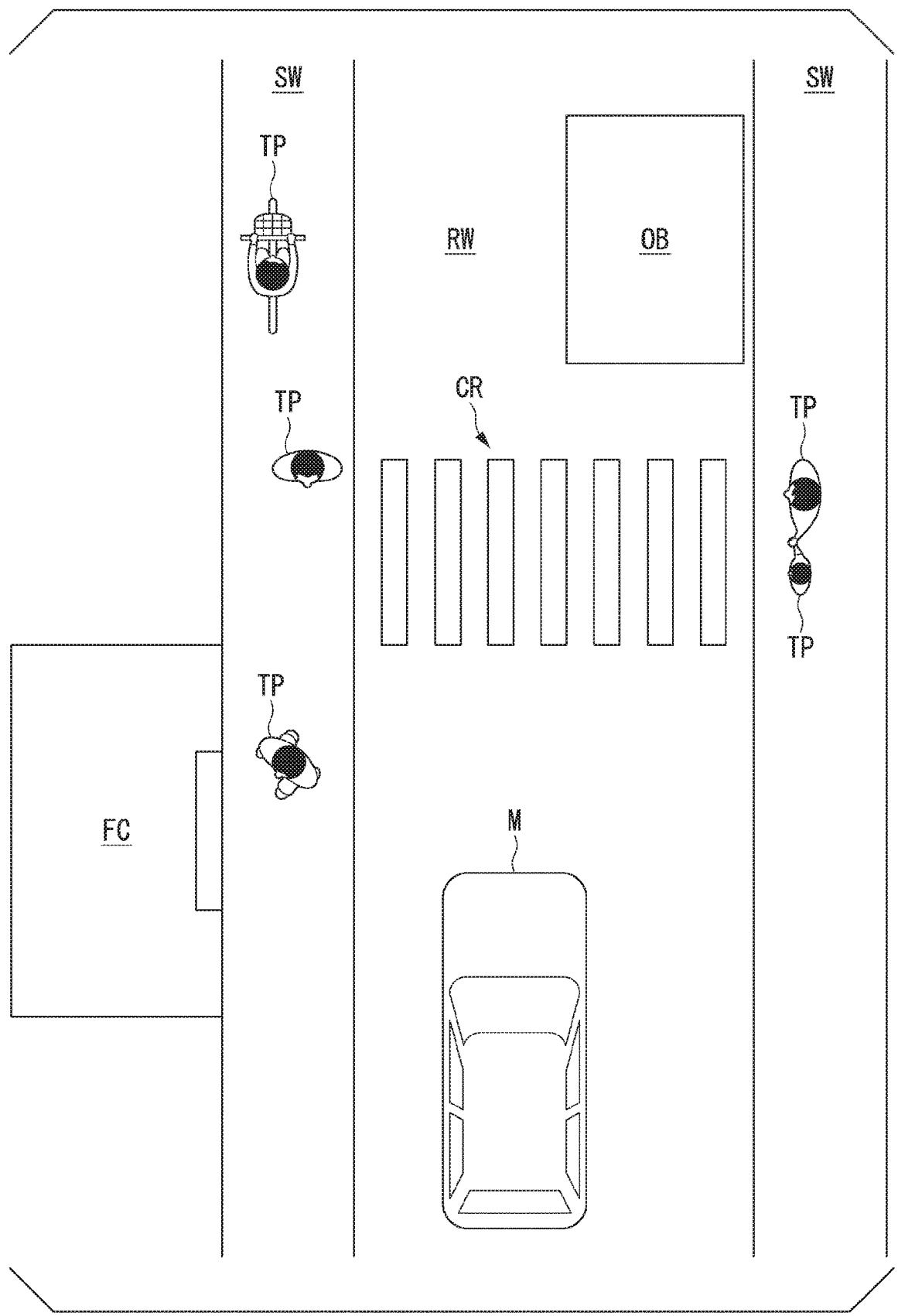
FIG. 3 is a schematic diagram of a situation around a subject vehicle recognized using the traffic participant monitor.

The details of processing performed using the traffic participant monitor 140 will be described below. FIG. 3 is a schematic diagram of a situation around the subject vehicle M recognized using the traffic participant monitor 140. As shown in FIG. 3, the situation around the subject vehicle M recognized using the traffic participant monitor 140 includes, for example, a sidewalk SW, a roadway RW, a pedestrian crossing CR, a building FC (specifically, a wall surface thereof, an entrance, and the like), an obstacle OB, and the like present therein. The traffic participant monitor 140 recognizes a range in which they are included in a coordinate system such as a ground coordinate system. The traffic participant monitor 140 recognizes positions of a plurality of traffic participants TP in time series based on the recognition results of the object position recognizer 134. The traffic participant monitor 140 performs the processing which will be described later based on the results of these recognitions.

The traffic participant monitor 140 includes, for example, a temporary goal determiner 142, a desired speed predictor 144, a force predictor 146, and a simulator 148.

The temporary goal determiner 142 determines a temporary goal which is a destination to which each of the plurality of traffic participants TP is trying to reach in the future. The temporary goal is repeatedly set over time. The temporary goal will eventually approach the goal. The temporary goal is a point which it is predicted the vehicle will reach after a first period T1 (for example, 4 [sec]). The temporary goal is updated at each prediction step.

The temporary goal determiner 142 includes, for example, a temporary goal candidate setter 142A and a temporary goal selector 142B.

The temporary goal candidate setter 142A sets m−1 temporary goal candidates Gpc(p) (p=1 to m−1) based on information related to a road structure to be recognized based on a history of a position of a traffic participant TP from a time point of a second period T2 (for example, 2 [sec]) from the present, information input from the camera 10, the radar device 12, and the LIDAR 14 via the object recognition device 16 or map information. The temporary goal candidate setter 142A determines temporary goal candidates Gpc(k) based on, for example, a scenario assumed in advance such as (1) the fact that the traffic participant TP is continuing to move on the sidewalk SW, (2) the fact that the traffic participant TP is crossing the pedestrian crossing CR, and (3) the fact that the traffic participant TP is moving to the nearest facility FC. For example, the temporary goal candidate setter 142A determines the temporary goal candidates Gpc(k) based on a discrete selection model (each selection includes a temporary target selection). The discrete selection model defines a set of selections (temporary target candidates) likely to be determined in advance based on driving scenes which are classified in accordance with the details such as the subject vehicle M being present at an intersection, a pedestrian crossing being present, and the subject vehicle M being in a shopping district. The temporary goal candidate setter 142A determines the specific details of a discrete set (a scenario) to be selected based on the presence of a sidewalk, a pedestrian crossing, an intersection, and the like recognized by the object position recognizer 134 and positions of a freeway, a shopping district, and the like recognized using the MPU 60. In the example of FIG. 3, the temporary goal candidate setter 142A sets one point on the sidewalk SW which is a destination in a current movement direction of the traffic participant TP as a temporary goal candidate Gpc(1) based on the scenario of (1), sets an intersection between a sidewalk SW at a side opposite to a side at which the traffic participant TP is present and the pedestrian crossing CR as a temporary goal candidate Gpc (2) based on the scenario (2), and sets an entrance of the facility FC as a temporary goal candidate Gpc(3) based on the scenario of (3). When the traffic participant TP is actually crossing the pedestrian crossing CR, two of (2) and (4) turning back may be selected as a scenario.

Also, the temporary goal candidate setter 142A extrapolates the prediction result of Kalman filter processing in the object position recognizer 134 and sets another temporary goal candidates Gpc(m) on the assumption that the traffic participant is continuously maintaining a current movement direction. Thus, the temporary goal candidate setter 142A sets a total of m temporary goal candidates Gpc(p).

The temporary goal selector 142B calculates a movement direction θ intended by the traffic participant TP and obtains a reference goal position Gref using the movement direction θ. The movement direction θ is obtained through Expression (1). In the expression, w1, w2, w3, and w4 are coefficients. These coefficients may be fixed values or may be updated through machine learning or the like at any time. For example, the temporary goal selector 142B may input an image captured by the camera 10 to a learned model in which a direction of an upper body and a direction of a face are derived, thereby acquiring information concerning the direction of the upper body and the direction of the face. Instead of this, the temporary goal selector 142B may acquire information concerning a direction of an upper body and a direction of a face by performing certain rule-based processing on an image captured by the camera 10. For example, the temporary goal selector 142B may perform calculation using the deviation of a position of characteristic portions such as a bridge of a nose in a face region and a direction of a line of sight based on an iris position as input parameters and calculate a direction of the face. A recognition speed vector is information recognized by the object position recognizer 134. For example, when a direction of an upper body, a direction of a face, and a recognition speed vector move in a direction in which a pedestrian is deviating from a pedestrian crossing or a sidewalk, an influence of the road structure is a correction term for canceling out a component thereof.

$$\text{Movement direction } \theta = w1 \times (\text{direction of upper body}) + w2 \times (\text{direction of face}) + w3 \times (\text{recognition speed vector}) + w4 \times (\text{influence of road structure}) \quad (1)$$

Instead of the above, if an influence or the like of a direction of an upper body, a direction of a face, a recognition speed vector, and a road structure is input, the temporary goal selector 142B may acquire the movement direction θ by inputting the influence or the like of the direction of the upper body, the direction of the face, the recognition speed vector, and the road structure to the model in which the movement direction θ is output.

Figure 4:
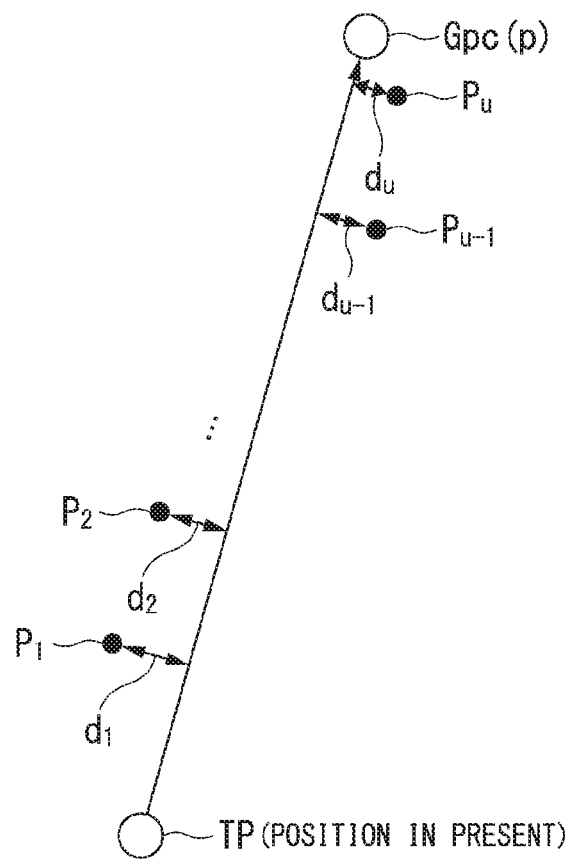
FIG. 4 is a diagram for explaining the details of processing using the temporary goal selector.

The temporary goal selector 142B obtains a reference goal position Gref on the assumption that the traffic participant TP is moving in a movement direction θ during a first period T1 at a predetermined speed. For example, a speed of the traffic participant TP acquired a predetermined number of cycles ago (for example, 2 cycles) may be used as a predetermined speed. Furthermore, the temporary goal selector 142B inputs each of the temporary goal candidates Gpc(p) to a movement simulation model and obtains an estimated position of the traffic participant TP at a plurality of time points during a first period T1 in the future. The movement simulation model is, for example, the same as the model used for a simulation performed by the simulator 148 which will be described later. In addition, the temporary goal selector 142B determines a temporary goal candidate Gpc(p) with the smallest deviation as a temporary goal Gp by comparing a reference line formed by connecting current positions of the traffic participant TP to the reference goal position Gref with a straight line, a curved line, or polygonal line according to the road structure, or the like with estimated positions of the traffic participant TP at a plurality of time points for each temporary goal candidate Gpc(p). FIG. 4 is a diagram for explaining the details of processing using the temporary goal selector 142B. For example, the temporary goal selector 142B determines, as a temporary goal Gp, a temporary goal candidate Gpc(p) having the smallest sum (a sum of squares) $\Sigma_{q=1}^{u} d_q$ of values obtained by squaring distances between a reference line and estimated positions $P_1$ to $P_u$ of the traffic participant TP at a plurality of time points (for example, 1 to u) calculated for each temporary goal candidate Gpc(p).

Instead of the above, the temporary goal determiner 142 may determine a temporary goal Gp of the traffic participant TP using a situation around the subject vehicle M as context information and using a model through a support vector machine (SVM) model or a multivariate regression analysis method. This model is learned based on an action of the traffic participants TP collected in an actual traffic situation. The context information is, for example, a distance between a pedestrian crossing and a traffic participant TP, an influence of a road structure, a positional relationship with a vehicle, the movement of a head section of a traffic participant TP, and the like.

Figure 5:
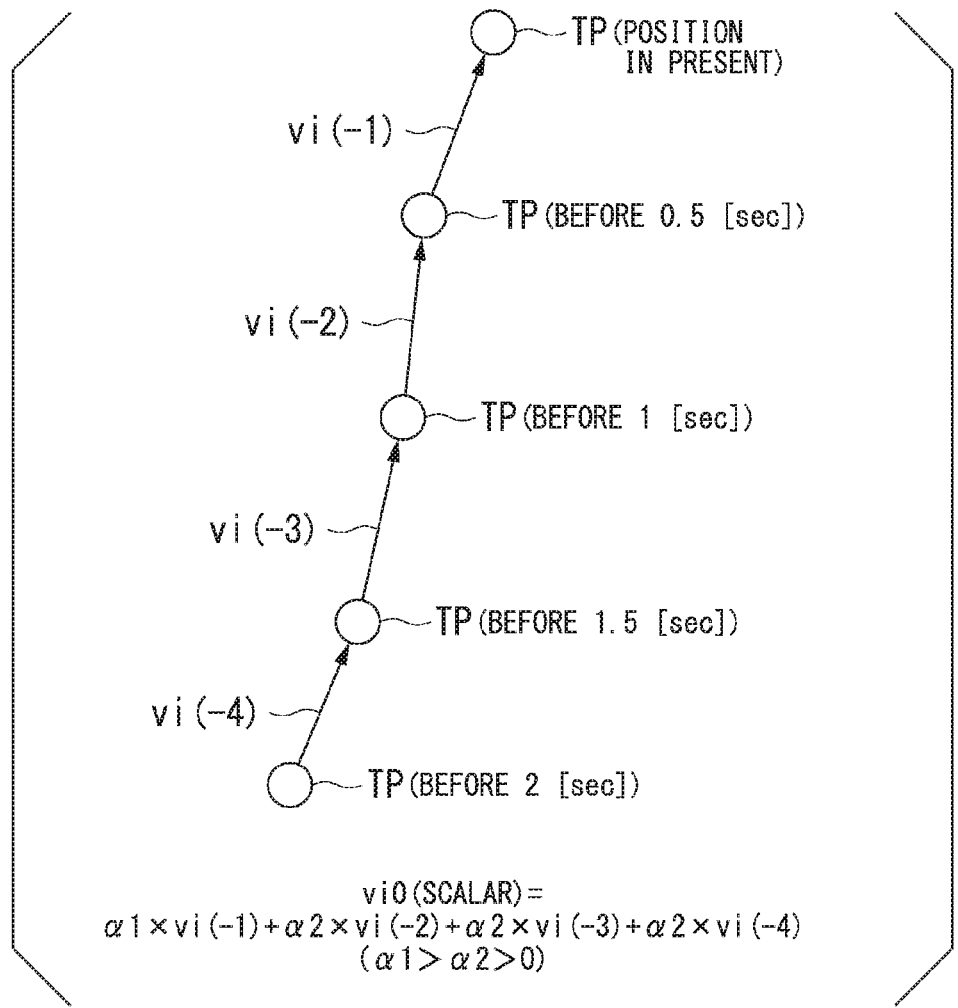
FIG. 5 is a diagram for explaining processing using a desired speed predictor.

The desired speed predictor 144 estimates a desired speed vector →vi0 of the traffic participant TPi using a history of a position of the traffic participants TP in the past. Hereinafter, "→" indicates a vector. An $i^{th}$ traffic participant TP recognized by the object position recognizer 134 is referred to as a "traffic participant TPi." i is identification information of the traffic participant TP. In order to obtain a desired speed magnitude vi0, the desired speed predictor 144 obtains a weighted moving average of speeds in a plurality of steps in a third period T3 in the past (for example, 2 [sec]). FIG. 5 is a diagram for explaining processing using the desired speed predictor 144. The desired speed predictor 144 may increase a weight of, for example, a fourth period T4 (for example, 0.5 [sec]) near the end of the third period T3 (close to the present) compared to other periods. The desired speed predictor 144 sets a direction of a desired speed vector →vi0 as a direction in which the traffic participant TPi moves from a current position of the traffic participant TPi toward the temporary goal GPi.

The force predictor 146 estimates a virtual force acting on each of the plurality of traffic participants TP based on the surrounding environment of the plurality of traffic participants TP. The force predictor 146 estimates, for example, a force received from the traffic participant TP himself/herself, forces acting on each other, and a force exerted from an object on each traffic participant TP. These forces are virtual forces to be estimated. The force predictor 146 estimates a spontaneous force F1$i$, a social force F2$i$, and a physical force F3$i$ and sums them to obtain a force acting on the traffic participant TPi (hereinafter the term "virtual" will be omitted). The details of calculation and processing performed by the force predictor 146 using mathematical expressions will be described below. Expression (2) represents a force calculated by the force predictor 146 for the traffic participant TP. In Expression (2), "→" indicating a vector will be omitted. In the expression, k includes a traffic participant TP other than a traffic participant TPi, a vehicle, an obstacle, a wall, a crossing state (the fact that a traffic participant is crossing a roadway), and a sidewalk boundary (hereinafter these are referred to as "influence factors"). In addition, it is assumed that n influence factors are present. The force predictor 146 performs the following calculation under an assumption that influence factors exerting a force on the traffic participant TPi are limited to the influence factors present in a fan-shaped range centering on a forward direction of the traffic participant TPi and influence factors outside of this range have no effect. In Expression (2), $F^{motivation}$ is a spontaneous force, $F^{pedestrian}$ is a force exerted by a pedestrian which is an influence factor, $F^{vehicle}$ is a force exerted by a vehicle which is an influence factor, $F^{obstacle}$ is a force exerted by an obstacle which is an influence factor, $F^{wall}$ is a force exerted by a wall which is an influence factor, $F^{crosswalk}$ is a force exerted by a crossing state which is an influence factor, and $F^{sidewalk}$ is a force exerted by a sidewalk boundary which is an influence factor.

$$F_i^{total} = \sum_{k=0, k \neq i}^{n} \left( \underbrace{F^{motivation}}_{F1i} + \underbrace{F_k^{pedestrian} + F_k^{vehicle}}_{F2i} + F_k^{obstacle} + F_k^{wall} + \underbrace{F_k^{crosswalk}}_{F3i} + F_k^{sidewalk} \right) \quad (2)$$

The spontaneous force F1$i$ is a force in which the traffic participant TPi exerts on the traffic participant TPi himself/herself so that the traffic participant TPi moves at a desired speed. The force predictor 146 calculates the spontaneous force F1$i$ based on a desired speed vector →vi0. The spontaneous force F1$i$ represents the acceleration/deceleration of the traffic participant TPi as a result of attempting to move with the desired speed vector →vi0 in a dimension of force. The spontaneous force →F1$i$ is, for example, represented by Expression (3). In the expression, →vi is a current speed vector of the traffic participant TPi and τ is a time required to match the speed vector →vi with the desired speed vector →vi0.

$$F1(F^{motivation}) = (1/\tau) \cdot (\rightarrow vi0 - \rightarrow vi) \quad (3)$$

Each of the social force F2$i$ and the physical force F3$i$ is estimated by calculating a sum (or a weighted sum) of three components, i.e., a repulsive force, a compressive force, and a frictional force exerted by the influence factors.

In Expression (2), $F_k^{pedestrian}$ is a force exerted by a pedestrian which is a $k^{th}$ influence factor, $F_k^{wall}$ is a force exerted by a wall which is a $k^{th}$ influence factor, and $F_k^{obstacle}$ is a force exerted by an obstacle which is a $k^{th}$ influence factor. These are represented by Expression (4). In the expression, repulsion represents a repulsive force, compression represents a compressive force, and friction represents a frictional force.

$$F_k^{pedestrian} = F_{k\,repulsion}^{pedestrian} + F_{k\,compression}^{pedestrian} + F_{k\,friction}^{pedestrian}$$

$$F_k^{wall} = F_{k\,repulsion}^{pedestrian} + F_{k\,compression}^{pedestrian} + F_{k\,friction}^{pedestrian}$$

$$F_k^{obstacle} = F_{k\,repulsion}^{obstacle} + F_{k\,compression}^{obstacle} + F_{k\,friction}^{obstacle} \quad (4)$$

Each term of $F_k^{pedestrian}$ is represented by Expression (5). In the expression, Aped, Bped, Cped, and Kped are matching values obtained by tests and the like. $r_{ik}$ is a sum of radii of a private space to be preset for each of the traffic participants TPi and an influence factor k. The private space is a space in which the traffic participant TP behaves to prevent another person from entering the space. When the influence factor is not a traffic participant, a pseudo private space is set. $d_{ik}$ is a Euclidean distance between the traffic participant TPi and the influence factor k. $n_{ik}$ is represented by Expression (6) and $t_{ik}$ is represented by Expression (7). In Expression (7), (1) indicates an x element and (2) indicates a y element. Φ is an angle of a difference in a movement direction (a direction of a speed vector) between the traffic participant TPi and the influence factor k. $dv_{ik}$ is a difference vector between a speed vector of the traffic participant TPi and a speed vector of the influence factor k. Each term of $F_k^{pedestrian}$ may be replaced with zero when a negative value is provided. Bped is a coefficient of a magnitude of a force generated by an Exp function. First, when a minimum value and a maximum value of a force generated by a social force of each element are determined and Bped is adjusted, it is possible to control a rate of change in social force with respect to a change in $r_{ik} - d_{ik}$. Bped acts similarly in Expressions (8) and (9).

$$F_{k\,repulsion}^{pedestrian} = A_{ped} \cdot e^{\frac{r_{ik} - d_{ik}}{B_{ped}}} \cdot n_{ik} \cdot (1 - \cos\Phi) \quad (5)$$

$$F_{k\,compression}^{pedestrian} = C_{ped} \cdot (r_{ik} - d_{ik}) \cdot n_{ik}$$

$$F_{k\,friction}^{pedestrian} = K_{ped} \cdot (r_{ik} - d_{ik}) \cdot dv_{ik} \cdot t_{ik}$$

$$n_{ik} = \frac{r_i - r_j}{\|r_i - r_j\|} \quad (6)$$

$$t_{ik} = [-n_{ik}(2)\ n_{ik}(1)] \quad (7)$$

With regard to Aped in Expression (5), the force predictor 146 may estimate whether the traffic participant TPi and the influence factor k (in this case, another traffic participant) form a group in advance and reduce a value among traffic participants which are estimated to belong to the same group as compared with traffic participants which are not estimated to belong to the same group (may be near zero or a negative value). This is because traffic participants forming a group move while maintaining a distance within a certain distance in many cases. When positions of two traffic participants in a certain period in the past have been present within a predetermined range and a difference in a movement direction (a direction of a speed vector) in a certain period has been less than a threshold value, the force predictor 146 may estimate that the two traffic participants form a group, and may perform estimation in an influencing manner in the case of three or more traffic participants.

Bicycles may be treated as pedestrians and included in $F_k^{pedestrian}$. Here, a radius of a private space is 1.5 times that of a pedestrian.

Respective terms of $F_k^{obstacle}$ are represented by Expression (8). In the expression, Aobs, Cobs, and Kobs are matching values obtained by tests and the like. Each term of $F_k^{obstacle}$ may be replaced with zero when a negative value is provided.

$$F_{k\ compression}^{obstacle} = C_{obs} \cdot (r_{ik} - d_{ik}) \cdot n_{ik} \quad (8)$$

$$F_{k\ friction}^{obstacle} = K_{obs} \cdot (r_{ik} - d_{ik}) \cdot dv_{ik} \cdot t_{ik}$$

$$F_{k\ repulsion}^{obstacles} = A_{obs} \cdot e^{\frac{r_{ik} - d_{ik}}{B_{ped}}} \cdot n_{ik}$$

Each term of $F_k^{wall}$ is represented by Expression (9). In the expression, Awall, Cwall, and Kwall are matching values obtained by tests and the like. Each term of $F_k^{wall}$ may be replaced with zero when a negative value is provided. When $n_{ik}$ or $t_{ik}$ is obtained for a wall, the force predictor 146 may use, for example, as a reference, a point which intersects a movement destination of a traffic participant TPi obtained through extrapolation.

$$F_{k\ compression}^{walls} = C_{wall} \cdot (r_{ik} - d_{ik}) \cdot n_{ik} \quad (9)$$

$$F_{k\ friction}^{walls} = K_{wall} \cdot (r_{ik} - d_{ik}) \cdot dv_{ik} \cdot t_{ik}$$

$$F_{k\ repulsion}^{walls} = A_{wall} \cdot e^{\frac{r_{ik} - d_{ik}}{B_{ped}}} \cdot n_{ik}$$

$F_k^{sidewalk}$ is a force exerted by a wall which is a $k^{th}$ influence factor. $F_k^{sidewalk}$ is represented by Expression (10). In the expression, $K_{side}$ is a matching value obtained by a test and the like. $n_{sk}$ is a unit vector in a direction in which a traffic participant TPi needs to move to be present in a sidewalk. $d_{safe\_s}$ is a distance corresponding to a clearance set when a boundary of a sidewalk is not indicated by a physical boundary such as a curb or a guardrail. $F_k^{crosswalk}$ is a force exerted by a crossing state which is a $k^{th}$ influence factor. $F_k^{crosswalk}$ is represented by Expression (11). In the expression, $K_{cross}$ is a matching value obtained by a test and the like. $n_{ck}$ is a unit vector in which the traffic participant TPi moves from a position of the traffic participant TPi to a sidewalk close to the position. $d_{safe\_c}$ is a distance corresponding to a clearance set when a boundary of a pedestrian crossing is not indicated by a physical boundary such as a curb or a guardrail. $F_k^{vehicle}$ is a force exerted by a vehicle which is a $k^{th}$ influence factor. $F_k^{vehicle}$ is represented by Expression (12). Here, Expression (12) is applied to a moving vehicle, and a parked or stopped vehicle is treated as an obstacle and is subjected to Expression (8). In the expression, $n_{kcar}$ is a unit vector in which the traffic participant TPi moves from a position of a traffic participant to a sidewalk close to the position when the traffic participant TPi is present on a roadway. TTC is a time to collision, that is, a collision time calculated between a position of a traffic participant projected onto a roadway and a position of a vehicle. h is a parameter for normalizing the TTC and is set to a maximum value of a TTC to be assumed. h is a parameter (a user setting parameter) experimentally obtained by repeatedly performing data analysis and a simulation.

$$F_k^{sidewalk} = K_{side} \cdot (d_{safe\_s} + r_k - d_{sk}) \cdot n_{sk} \quad (10)$$

$$F_k^{crosswalk} = K_{cross} \cdot (d_{safe\_c} + r_k - d_{ck}) \cdot n_{ck} \quad (11)$$

$$F_k^{vehicle} = K_{vehicle} \cdot e^{-\frac{TTC}{h}} \cdot n_{kcar} \quad (12)$$

Figure 6:
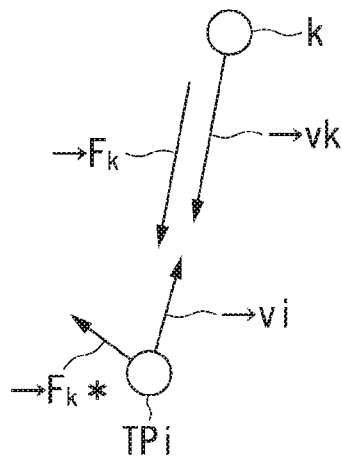
FIG. 6 is a diagram for explaining a process of obtaining a force of a local frame.

If the temporary goal Gp, the desired speed →vi0, and various forces are obtained in this way, the simulator 148 obtains positions in the future in a plurality of steps (time points) during a first period T1 through a simulation by inputting the temporary goal Gp, the desired speed →vi0, and the various forces to a movement model for all traffic participants and vehicles recognized by the object position recognizer 134. The temporary goal Gp and the desired speed →vi0 are fixed during a second period T2. If the second period T2 has elapsed, the simulator 148 selects the temporary goal Gp as in the temporary goal candidate setter 142A and the temporary goal selector 142B and simulates the movement of the traffic participant on the assumption that the traffic participant moves toward the temporary goal Gp. In this simulation, the traffic participant moves toward the temporary goal Gp along the shortest route if no force is applied and moves, for example, in a direction in which a direction toward the temporary goal Gp and a direction of a force are combined at a ratio according to a magnitude of a force when the force is applied. That is to say, the simulator 148 simulates a movement process in which each of a plurality of traffic participants moves toward the temporary goal Gp determined by the temporary goal determiner 142 using the movement model to estimate actions of the plurality of traffic participants in the future. The movement model is, for example, the human locomotion model described in Non-Patent Document 2. The movement model is not limited to this and may be any model as long as the movement model estimates positions in the future at a plurality of time points through a simulation based on the above input information. At this time, the simulator 148 may perform the calculation by converting a force due to the approach of another person into a force of a local frame when a direction in which the force due to the approach of the other person acts is not caused to act on the traffic participant as it is. FIG. 6 is a diagram for explaining a process of obtaining a force of a local frame. In FIG. 6, →vi is a speed vector of a traffic participant TPi, →vk is a speed vector of an influence factor k, and →$F_k$ is a force exerted on a traffic participant TPi by an influence factor k. In this case, since directions of →vi and →$F_k$ are substantially opposite to each other, the simulator 148 may correct a force →$F_k$ such that it does not act on the traffic participant TPi as it is, and may correct the force →$F_k$ such that it has a direction of turning around the force →$F_k$ (for example, →$F_k$* in FIG. 6). In this way, it is possible to prevent the simulation result in which the traffic participant comes and goes unnaturally.

Figure 7:
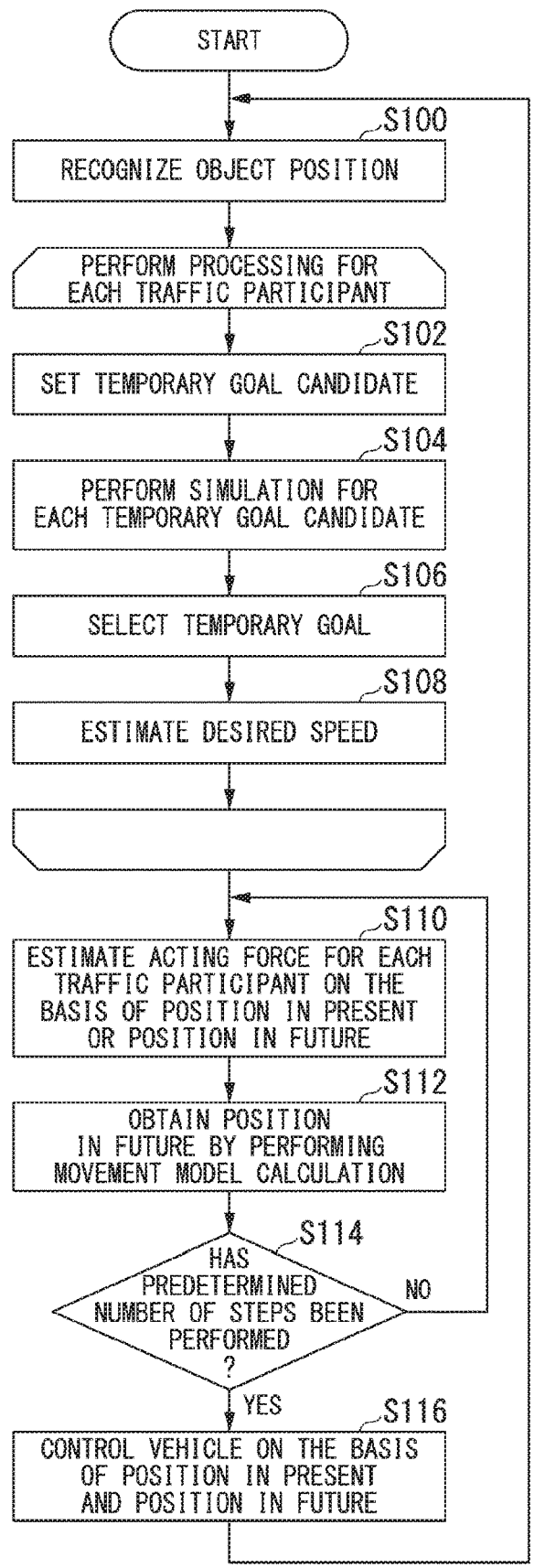
FIG. 7 is a flowchart for describing an example of a flow of processing performed using the automated driving control device.

FIG. 7 is a flowchart for describing an example of a flow of a process performed using the automated driving control device 100. In this flowchart, attention is paid to a part of predicting actions of the traffic participant in the future and a description of processing such as subject vehicle position recognition will be omitted.

First, the object position recognizer 134 recognizes a position of an object including a traffic participant (Step S100).

Subsequently, the temporary goal determiner 142 and the desired speed predictor 144 perform the processes of Steps S102 to S108 for each traffic participant (Step S102). First, the temporary goal candidate setter 142A sets the temporary goal candidates Gpc(p) and the temporary goal selector 142B performs a simulation for each temporary goal candidate Gpc(p) (Step S104). The temporary goal selector 142B selects a Gpc(p) having the smallest deviation from a route to the reference goal position Gref as a temporary goal (Step S106). The desired speed predictor 144 estimates a desired speed (Step S108).

Subsequently, the force predictor 146 estimates an acting force for each traffic participant based on a current position recognized in Step S100 or a position in the future acquired in the next Step S112 (Step S110). The simulator 148 performs a simulation based on a temporary goal Gp and a force using a movement model and obtains a position of the traffic participant in the future after one cycle (Step S112). The traffic participant monitor 140 determines whether the processes of Steps S110 and S112 have been performed for a predetermined number of cycles (Step S114). When it is determined that the predetermined number of cycles has not been performed, the process returns to the process of Step S110. When it is determined that the predetermined number of cycles has been performed, the action plan generator 160 performs vehicle control based on a current position and a position in the future of a traffic participant and the like (Step S116). For example, when an action of a subject vehicle M in the future is determined, the action plan generator 160 sets a risk region centering on a position of a traffic participant or the like at a time point in the future and generates a target trajectory in which approach to the risk region is minimized

[Hardware Constitution]

Figure 8:
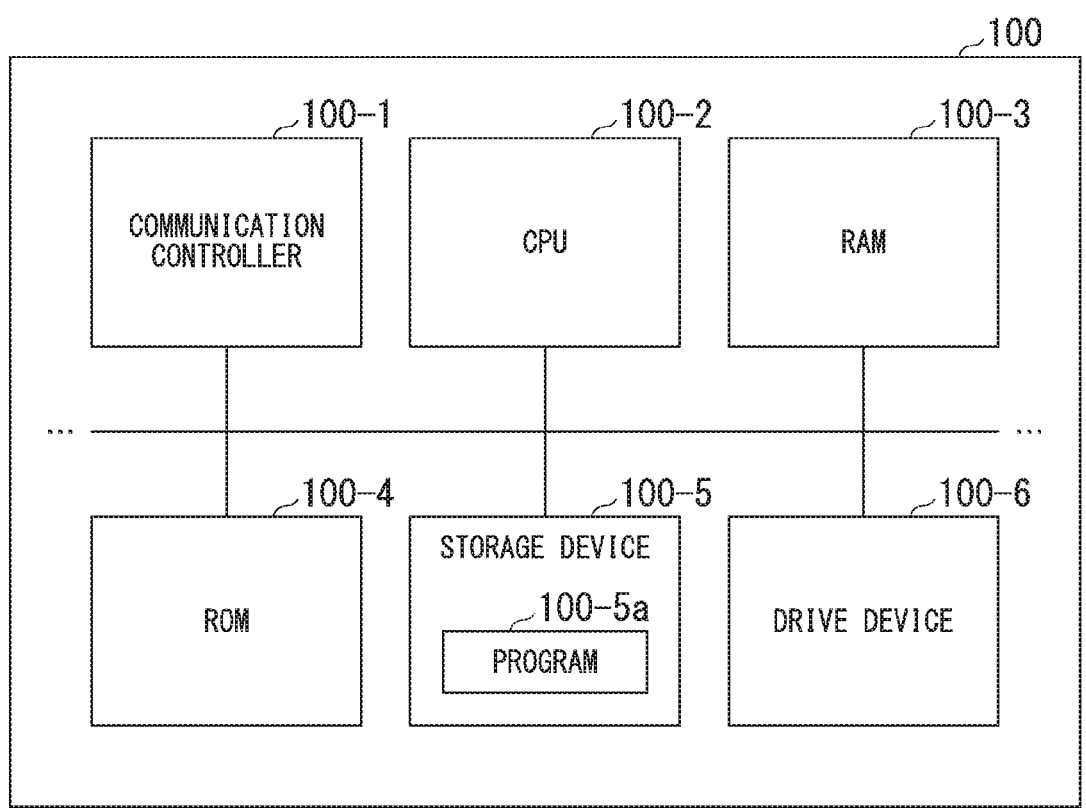
FIG. 8 is a diagram illustrating an example of a hardware constitution of the automated driving control device in an embodiment.

FIG. 8 is a diagram illustrating an example of a hardware constitution of the automated driving control device 100 in the embodiment. As shown in the drawing, the automated driving control device 100 is constituted of a communication controller 100-1, a CPU 100-2, a random access memory (RAM) 100-3 utilized as a working memory, a read only memory (ROM) 100-4 storing a boot program and the like, a storage device 100-5 such as a flash memory and a hard disk drive (HDD), a drive device 100-6, and the like which are connected to each other through an internal bus or a dedicated communication line. The communication controller 100-1 communicates with constituent elements other than the automated driving control device 100. The storage device 100-5 stores a program 100-5a executed using the CPU 100-2. This program is developed in the RAM 100-3 using a direct memory access (DMA) controller (not shown) or the like and executed using the CPU 100-2. Thus, a part or all of the recognizer 130, the action plan generator 160, and the second controller 180 are realized.

According to the embodiment described above, when an object position recognizer 134 which recognizes positions of a plurality of traffic participants, a temporary goal determiner 142 which determines a temporary goal in which each of the plurality of traffic participants is trying to reach in the future based on the recognition result of the object position recognizer, and a simulator 148 which simulates a movement process in which each of the plurality of traffic participants moves to a temporary goal determined using the temporary goal determiner using a movement model to estimate an action in the future of each of the plurality of traffic participants are provided, it is possible to make a prediction according to an actual traffic situation.

Although the embodiments for carrying out the present invention have been described using the embodiments as described above, the present invention is not limited to these embodiments at all and various modifications and substitutions are possible without departing from the gist of the present invention.

What is claimed is:

1. A device, comprising:
a storage device configured to store a program; and
a hardware processor,
wherein, the hardware processor executes the program stored in the storage device to:
recognize positions of a plurality of traffic participants;
determine a temporary goal which each of the plurality of traffic participants is trying to reach in the future, based on the recognition results; and
simulate a movement process in which each of the plurality of traffic participants moves toward the temporary goal using a movement model to estimate an action in the future of each of the plurality of traffic participants;
wherein, for each of the plurality of traffic participants, the hardware processor sets a plurality of temporary goal candidates based on histories of the recognized positions of the plurality of traffic participants and information indicating a road structure, and
obtains a deviation between the results of a simulation in which each of the traffic participants moves to each of the plurality of temporary goal candidates and a movement direction based on a posture of the traffic participants, and determines, as the temporary goal, a temporary goal candidate having the smallest deviation.

2. The device according to claim 1,
wherein the movement model simulates a movement process of the traffic participant in the future in each step by reflecting a virtual force acting on each of the plurality of traffic participants, and
the hardware processor estimates the virtual force based on the surrounding environment of the plurality of traffic participants.

3. The device according to claim 2,
wherein the hardware processor estimates the virtual force on the assumption that an influence factor in which the virtual force is exerted on each of the plurality of traffic participants is limited to influence factors present within a fan-shaped range centering on a forward direction of each of the traffic participants and an influence factor outside of this range does not exert a force.

4. The device according to claim 2,
wherein the virtual force includes a force for performing acceleration and deceleration so that the traffic participant himself/herself moves at a desired speed, and
the hardware processor estimates the desired speed based on a history of a position in the past of the traffic participant.

5. The device according to claim 2,
wherein the virtual forces includes forces repelling each other among the traffic participants, and the hardware processor estimates traffic participants forming a group among the plurality of traffic participants and reduces the forces repelling each other among the traffic participants which are estimated to belong to the same group as compared with traffic participants which are not estimated to belong to the same group.

6. The device according to claim 1,
wherein the hardware processor controls the traveling of a vehicle based on the estimated actions in the future of each of the plurality of traffic participants.

7. A method executed using a computer, comprising:
recognizing positions of a plurality of traffic participants;
determining a temporary goal to be reached in the future for each of the plurality of traffic participants, based on the recognition results; and
simulating a movement process in which each of the plurality of traffic participants moves toward the determined temporary goal using a movement model to estimate an action in the future of each of the plurality of traffic participants;
for each of the plurality of traffic participants, setting a plurality of temporary goal candidates based on histories of the recognized positions of the plurality of traffic participants and information indicating a road structure, and
obtaining a deviation between the results of a simulation in which each of the traffic participants moves to each of the plurality of temporary goal candidates and a movement direction based on a posture of the traffic participants, and determining, as the temporary goal, a temporary goal candidate having the smallest deviation.

8. A non-transitory storage medium which stores a program causing a computer to execute:
recognizing positions of a plurality of traffic participants;
determining a temporary goal to be reached in the future for each of the plurality of traffic participants, based on the recognition results;
simulating a movement process in which each of the plurality of traffic participants moves toward the determined temporary goal using a movement model to estimate an action in the future of each of the plurality of traffic participants,
for each of the plurality of traffic participants, setting a plurality of temporary goal candidates based on histories of the recognized positions of the plurality of traffic participants and information indicating a road structure, and
obtaining a deviation between the results of a simulation in which each of the traffic participants moves to each of the plurality of temporary goal candidates and a movement direction based on a posture of the traffic participants, and determining, as the temporary goal, a temporary goal candidate having the smallest deviation.

\* \* \* \* \*